Patented June 9, 1953

2,641,563

UNITED STATES PATENT OFFICE 2,641,563

INSECTICIDAL AND ACARICIDAL COMPOSITION COMPRISING PROPYLENE GLYCOL AND ALKALI AMMONIUM SULFO SULFIDE

Joseph B. Moore, Edina, Minn., assignor to McLaughlin Gormley King Company, Minneapolis, Minn., a corporation of Minnesota No Drawing. Application May 16, 1951, Serial No. 226,739

12 Claims. (Cl. 167—14)

This invention relates to insecticidal compositions and particularly to those having pronounced acaricidal properties. The invention also relates to and it is an object of the invention to provide compositions capable of being diluted in water to form solutions or dispersions which are effective against a variety of insects and particularly against mites and the eggs of mites, such as Pacific mite, *Tetranychus pacificus* McG; European red mites, *Paratetranychus pilosis* C and F; rust mites *Eriophyidae*; citrus red or purple mite, *Paratetranychus citri* McG; six-spotted mite, *Tetranychus sexmaculatus* Riley; brown mite, *Bryobia praetiosa* Koch; two-spotted mites, *Tetranychus bimaculatus*; on their host plants, such as citrus trees, apples, pears and other deciduous and coniferous trees and on shrubs, rose bushes and grapes.

It is an object of the invention to provide an improved insecticidal-acaricidal composition of especial effectiveness against mites and their eggs capable of use in dilute form where the carrier is water.

The invention involves the use of propylene glycol in conjunction with alkali ammonium sulfo sulfide for which the formula is approximately $(AlkNH_4S)_5S$. The term "alkali ammonium sulfo sulfide" used herein and in the claims includes a "potassium ammonium sulfo sulfide," "sodium ammonium sulfo sulfide," "lithium ammonium sulfo sulfide." The compound potassium ammonium sulfo sulfide, having the probable formula $(KNH_4S)_5S$, is preferred because potassium is a plant food and the availability of the potassium in the insecticide is beneficial to the plant metabolism, in addition to the beneficial effect of the compound as a whole in controlling insect infestation. The alkali ammonium sulfo sulfides are readily soluble in water and are customarily used in water solution and for convenience such compounds are used in available aqueous solution containing approximately 33% of active insecticidal material unless otherwise stated. Where the term "equivalent" is used in the specification or claims, it will be intended to mean a smaller amount of more concentrated solution or a larger amount of more dilute solution containing an amount of active ingredient approximately equal to that contained by a prescribed amount of 33% standardized solution of active insecticidal-acaricidal ingredient.

In preparing the insecticidal-acaricidal composition there is admixed from 1 to 4 parts by volume of the propylene glycol with 1 to 4 parts by volume of 33% solution of alkali ammonium sulfo sulfide, or an equivalent amount of stronger or weaker solution. The so-formed mixture is a homogenous, yellow-amber colored, clear, stable, liquid insecticidal concentrate which is readily marketable as such. It can be diluted with water to prepare spray composition for direct application.

The insecticidal-acaricidal compositions of the present invention are utilized for wet spraying purposes. Considerable variation is possible in the amount of water used to dilute, depending upon the type of spraying equipment available and the spray methods of the particular operator. In general, however, it has been found desirable to use from 1 to 3 quarts of the concentrate per 100 gallons of water in the final spraying material. It is also preferable that the user add a spreading agent such as calcium caseinate, potassium caseinate, soap or the like. Thus, the user may add one-fourth pound, more or less, of spreader for each 100 gallons of final spraying solution.

An advantage of the invention resides in the fact that the propylene glycol-alkali ammonium sulfo sulfide concentrate is compatible with dichlor diphenyl trichloro ethane (DDT) which may, therefore, be added without disturbing the effectiveness of the remaining ingredients. The propylene glycol of the composition has a synergistic effect in respect to the alkali ammonium sulfo sulfide, the killing effect of the composition being greater than that of equal concentrations of alkali ammonium sulfo sulfide or the propylene used alone.

A further advantage of the spray compositions of this invention resides in the fact that the composition is non-toxic to the operator applying the spray and the spray residue left on the foliage and fruit by the propylene-glycol-alkali ammonium sulfo sulfide is non-toxic to warm-blooded animals.

The final spray material made from the aforesaid insecticidal-acaricidal concentrate has exceptional value for use as an agricultural spray, particularly for controlling infestation of mites, such as Pacific mite, *Tetranychus pacificus* McG; European red mite, *Paratetranychus pilosis* C and F; rust mites, *Eriophyidae*; citrus red or purple mite, *Paratetranychus citri* McG; six-spotted mite, *Tetranychus sexmaculatus* Riley; brown mite, *Bryobia praetiosa* Koch; two-spotted mite, *Tetranychus bimaculatus*.

An especial advantage of the invention resides in the fact that the spray composition does not kill the predators of the mites. The propylene glycol-alkali ammonium sulfo sulfide spray solutions of the present invention have a considerably greater and more rapid killing effect upon the eggs of the mites, and prevent practically all the eggs from hatching, which is not the case where sprays of alkali ammonium sulfo sulfide or the propylene glycol are used alone.

By way of further illustrating the invention, but without limitation thereon reference is made to the following example:

Example

There was prepared a concentrate containing the following:

Propylene glycol—one pint.
Potassium ammonium sulfo sulfide (33% concentration aqueous solution)—one pint.

For use the concentrate composition was diluted in 100 gallons of water and utilized in the customary manner as a spray. A spreader, namely potassium caseinate was added in the amount of one-sixth pound for each 100 gallons of final spray mixture. The spray was especially effective against mites and their eggs but did not kill predators of mites, which is very important.

The foregoing spray composition was applied as a high pressure spray to grapefruit trees right after blooming. The temperature was 86 degrees and relative humidity 10% at the time of spraying. The finished spray solution was applied at the rate of 800 gallons per acre. Certain trees were left unsprayed and certain trees were sprayed with a solution containing potassium ammonium sulfo sulfide (one pint) in water (100 gallons) for purposes of comparsion. A check count of mites was made three days after spraying. It was found, during such check count, that the trees which were left unsprayed had an average of 100 mites per leaf, and the trees which were sprayed with a solution of potassium ammonium sulfo sulfide (1 pint) in water (100 gallons) had 172 mites on 40 leaves, or approximately 4.3 mites per leaf, whereas the spray composition of the present invention, namely potassium ammonium sulfo sulfide (1 pint) and propylene glycol (1 pint) in water (100 gallons) showed 21 mites for forty leaves or approximately .5 mite per leaf, thus demonstrating the marked superiority of the spray composition of the present invention. The foliage was undamaged and the spray composition exhibited a marked residual affectiveness.

The same spray composition of the present invention was utilized for the spraying of an entire grove of citrus trees, except for a few trees which were sprayed with a solution of potassium ammonium sulfo sulfide (1 pint) in water (100 gallons) for check purposes. When mite counts were made on the check trees 19 days after spraying there were found 65 mites per leaf, whereas the trees which were sprayed with the composition of the present invention had 1 mite per leaf, thus again demonstrating the marked superiority of the spray composition of the present invention, and the continued effectiveness thereof for a long period (nearly three weeks) after spraying.

In another check test propylene glycol (1 pint) in water (100 gallons) was sprayed on trees infested with European red mites, Pacific mites, Willamette mites, brown or clover mite and two-spotted mites. The spray was applied with high pressure in the usual amounts. An examination after spraying disclosed that such spray solution of propylene glycol (1 pint) in water (100 gallons) killed only 25% of the mite eggs, and was ineffective against the mites themselves.

The effectiveness of the combination of alkali ammonium sulfo sulfide and propylene glycol is accordingly much greater than the sum of the effects of the separate ingredients. This is due to an interaction or synergism of the ingredients, one upon the other. It may be noted in passing that in respect to mites of the types mentioned, a composition, in order to have real effectiveness, must (without harmful effect on the vegation) kill the mites as well as destroy the eggs, otherwise re-infestation rapidly occurs. Such total effectiveness against mites and eggs was observed when using the instant compounds, which meanwhile not only did not harm the vegetation, but actually benefited it.

As many apparently widely different embodiments of this invention may be made without departing from the spirit and scope thereof, it is to be understood that I do not limit myself to the specfic embodiments herein.

What I claim is:

1. A water miscible spray composition for agricultural spraying purposes comprising propylene glycol and alkali ammonium sulfo sulfide.
2. A water miscible spray composition for agricultural spraying purposes comprising propylene glycol and potassium ammonium sulfo sulfide.
3. A water miscible spray composition for agricultural spraying purposes comprising propylene glycol and sodium ammonium sulfo sulfide.
4. A water miscible spray composition for agricultural spraying purposes comprising 1 to 4 parts by volume of propylene glycol and a volume of aqueous solution of alkali ammonium sulfo sulfide equivalent to 1 to 4 parts by volume of 33% aqueous solution of said alkali ammonium sulfo sulfide.
5. A water miscible spray composition for agricultural spraying purposes comprising 1 to 4 parts by volume of propylene glycol and a volume of aqueous solution of potassium ammonium sulfo sulfide equivalent to 1 to 4 parts by volume of 33% aqueous solution of said potassium ammonium sulfo sulfide.
6. A water miscible spray composition for agricultural spraying purposes comprising 1 to 4 parts by volume of propylene glycol and a volume of aqueous solution of sodium ammonium sulfo sulfide equivalent to 1 to 4 parts by volume of 33% aqueous solution of said sodium ammonium sulfo sulfide.
7. A water miscible spray composition for agricultural spraying comprising propylene glycol and an aqueous solution of alkali ammonium sulfo sulfide equivalent to a volume of 33% aqueous solution of alkali ammonium sulfo sulfide which is approximately equal to the volume of glycol.
8. A water miscible spray composition for agricultural spraying comprising propylene glycol and an aqueous solution of potassium ammonium sulfo sulfide equivalent to a volume of 33% aqueous solution of potassium sulfo sulfide which is approximately equal to the volume of glycol.
9. An agricultrual spray composition comprising 1 to 3 quarts of concentrated insecticidal-acaricidal spraying composition of 1 to 4 parts by volume of propylene glycol and an aqueous solution of alkali ammonium sulfo sulfide equivalent to 1 to 4 parts by volume of 33% aqueous solution of said alkali ammonium sulfo sulfide for each 100 gallons of water and a spreader.

10. An agricultural spray composition comprising 1 to 3 quarts of concentrated insecticidal-acaricidal spraying composition of 1 to 4 parts by volume of propylene glycol and an aqueous solution of potassium ammonium sulfo sulfide equivalent to 1 to 4 parts by volume of 33% aqueous solution of said potassium ammonium sulfo sufide for each 100 gallons of water and a spreader.

11. An agricultural spray composition comprising a major proportion of water and a minor proportion of insecticidal-acaricidal composition, said composition containing 1 to 4 parts by volume of propylene glycol and a volume of aqueous solution of alkali ammonium sulfo sulfide equivalent to 1 to 4 parts by volume of 33% aqueous solution of said alkali ammonium sulfo sulfide.

12. An agricultural spray composition comprising a major proportion of water and a minor proportion of insecticidal-acaricidal composition, said composition containing 1 to 4 parts of propylene glycol by volume and an aqueous solution of potassium ammonium sulfo sulfide equivalent to 1 to 4 parts by volume of 33% aqueous solution of said potassium ammonium sulfo sulfide.

JOSEPH B. MOORE.

References Cited in the file of this patent

UNITED STATES PATENTS

| Number | Name | Date |
| --- | --- | --- |
| 2,017,594 | Gnadinger | Oct. 15, 1935 |
| 2,558,772 | Moore | July 3, 1951 |